United States Patent
Yang et al.

(10) Patent No.: US 9,300,452 B2
(45) Date of Patent: Mar. 29, 2016

(54) METHOD AND APPARATUS FOR TRANSMITTING CONTROL INFORMATION IN A WIRELESS COMMUNICATION SYSTEM

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 14/352,929

(22) PCT Filed: Oct. 22, 2012

(86) PCT No.: PCT/KR2012/008648
§ 371 (c)(1),
(2) Date: Apr. 18, 2014

(87) PCT Pub. No.: WO2013/058622
PCT Pub. Date: Apr. 25, 2013

(65) Prior Publication Data
US 2014/0241222 A1     Aug. 28, 2014

Related U.S. Application Data

(60) Provisional application No. 61/549,243, filed on Oct. 20, 2011, provisional application No. 61/560,795, filed on Nov. 16, 2011, provisional application No. 61/641,912, filed on May 3, 2012, provisional application No. 61/696,315, filed on Sep. 4, 2012, provisional application No. 61/705,133, filed on Sep. 24, 2012.

(51) Int. Cl.
*H04L 5/00* (2006.01)
*H04L 5/14* (2006.01)
*H04W 72/02* (2009.01)

(52) U.S. Cl.
CPC .............. *H04L 5/005* (2013.01); *H04L 5/001* (2013.01); *H04L 5/0028* (2013.01);
(Continued)

(58) Field of Classification Search
CPC .................. H04W 72/0493; H04W 72/0446; H04J 11/005; H04L 1/1843; H04L 1/1861; H04L 5/001
USPC ........................................................ 370/280
See application file for complete search history.

(56) References Cited

U.S. PATENT DOCUMENTS

2011/0261714 A1  10/2011  Pan et al.
2012/0120854 A1   5/2012  Zhang et al.
(Continued)

FOREIGN PATENT DOCUMENTS

| | | |
|---|---|---|
| JP | 2012-525781 A | 10/2012 |
| KR | 10-2011-0088556 A | 8/2011 |
| WO | WO 2011/124259 A1 | 10/2011 |

OTHER PUBLICATIONS

ZTE, "Support to Live-Change of Downlink-Uplink Allocation Ratio in LTE/TDD", 3GPP TSG RAN WG1 Meeting #52bis, R1-081415, Mar. 31-Apr. 4, 2008, 13 pgs.
(Continued)

*Primary Examiner* — Jackie Zuniga Abad
(74) *Attorney, Agent, or Firm* — Birch, Stewart, Kolasch & Birch, LLP

(57) ABSTRACT

The present invention relates to a wireless communication system. More particularly, the present invention relates to a method in which a terminal performs communication in a TDD-based wireless communication system having a plurality of CCs aggregated therein, the method comprising: a step of performing an uplink transmission or a downlink reception in each subframe on a first CC according to a first UL-DL configuration; and a step of performing an uplink transmission or a downlink reception in each subframe on a second CC according to a second UL-DL configuration. If the configuration of the subframe of the first CC is [U, D] and the configuration of the subframe of the second CC is [U, U] in subframes #k and #k+1, the subframe #k+1 of the second CC is set to X. The present invention also relates to an apparatus for the method.

10 Claims, 13 Drawing Sheets

(52) U.S. Cl.
CPC .............. *H04L 5/0091* (2013.01); *H04L 5/14* (2013.01); *H04L 5/1469* (2013.01); *H04W 72/02* (2013.01); *H04L 5/0023* (2013.01); *H04L 5/0048* (2013.01)

(56) References Cited

U.S. PATENT DOCUMENTS

| | | | |
|---|---|---|---|
| 2013/0039193 A1* | 2/2013 | Yin | H04W 72/0486 370/252 |
| 2013/0322304 A1* | 12/2013 | Yang | H04W 72/042 370/280 |

OTHER PUBLICATIONS

Huawei, HiSilicon, "Discussion on inter-band TDD CA with different UL-DL configurations", 3GPP TSG RAN WG1 Meeting #66bis, R1-112892, Oct. 10-14, 2011, 5 pages.

New Postcom, "Inter-band CA with different UL-DL configuration in TDD", 3GPP TSG RAN WG1 Meeting #66bis, R1-113040, Oct. 10-14, 2011, 5 pages.

Pantech, "Discussion on support of simultaneous transmission and reception for inter-band CA with different TDD configuration", 3GPP TSG RAN1 #66bis, R1-113102, Oct. 10-14, 2011, 4 pages.

MediaTek Inc., "HARQ Feedback Mechanism in CA with Different TDD Configurations," 3GPP TSG-RAN WG1 Meeting #66, R1-112349, Athens, Greece, Aug. 22-26, 2011, pp. 1-5.

* cited by examiner

PUCCH format 1a and 1b structure (normal CP case)

PUCCH format 1a and 1b structure (extended CP case)

FIG. 11

|  | | SF#k | SF#k+1 | |
|---|---|---|---|---|
| XCC | ... | U or X | D | ... |

|  | | | | |
|---|---|---|---|---|
| YCC | ... | U | X | ... |

Y(k)=U: Sol 1~4 is applied (to only case in which YCC=SCC)

FIG. 12

|  | | SF#k | SF#k+1 | |
|---|---|---|---|---|
| XCC | ... | D | X | ... |

|  | | SF#k | SF#k+1 | |
|---|---|---|---|---|
| YCC | ... | S or X | U | ... |

X(k)=D or Y(k+1)=U: Alt 1~12 is applied (to only case in which XCC=SCC)

METHOD AND APPARATUS FOR TRANSMITTING CONTROL INFORMATION IN A WIRELESS COMMUNICATION SYSTEM

CROSS REFERENCE TO RELATED APPLICATIONS

This application is the National Phase of PCT/KR2012/008648 filed on Oct. 22, 2012, which claims priority under 35 U.S.C. §119(e) to U.S. Provisional Application No. 61/549,243 filed on Oct. 20, 2011, U.S. Provisional Application No. 61/560,795 filed on Nov. 16, 2011, U.S. Provisional Application No. 61/641,912 filed on May 3, 2012, U.S. Provisional Application No. 61/696,315 filed on Sep. 4, 2012, and U.S. Provisional Application No. 61/705,133 filed on Sep. 24, 2012, all of which are hereby expressly incorporated by reference into the present application.

TECHNICAL FIELD

The present invention relates to a wireless communication system and, more specifically, to a method and apparatus for transmitting/receiving control information. The wireless communication system can support carrier aggregation.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting/receiving control information in a wireless communication system and an apparatus for the same. Another object of the present invention is to provide a channel format, a resource allocation scheme and a signal processing method for efficiently transmitting/receiving control information and an apparatus for the same. Another object of the present invention is to provide a method for efficiently allocating resources for transmitting/receiving control information and an apparatus for the same.

The technical problems solved by the present invention are not limited to the above technical problems and those skilled in the art may understand other technical problems from the following description.

Technical Solution

The object of the present invention can be achieved by providing a method in which a UE performs communication in a time division duplexing (TDD)-based wireless communication system supporting aggregation of a plurality of CCs, the method including: performing uplink transmission or downlink reception in each subframe on a first CC according to a first UL-DL configuration; and performing uplink transmission or downlink reception in each subframe on a second CC according to a second UL-DL configuration, wherein, when a subframe configuration of the first CC and a subframe configuration of the second CC include configurations shown in the following table, subframe #k+1 of the second CC is set to X

|           | Subframe #k | Subframe #k + 1 |
|-----------|-------------|-----------------|
| First CC  | U           | D               |
| Second CC | U           | U               | wherein U denotes an uplink subframe, D denotes a downlink subframe and X denotes a subframe in which signal transmission is limited.

In another aspect of the present invention, provided herein is a UE for use in a TDD-based wireless communication system supporting aggregation of a plurality of CCs, the UE including: a radio frequency (RF) unit; and a processor, wherein the processor is configured to perform uplink transmission or downlink reception in each subframe on a first CC according to a first UL-DL configuration and to perform uplink transmission or downlink reception in each subframe on a second CC according to a second UL-DL configuration, wherein, when a subframe configuration of the first CC and a subframe configuration of the second CC include configurations shown in the following table, subframe #k+1 of the second CC is set to X

|           | Subframe #k | Subframe #k + 1 |
|-----------|-------------|-----------------|
| First CC  | U           | D               |
| Second CC | U           | U               | wherein U denotes an uplink subframe, D denotes a downlink subframe and X denotes a subframe in which signal transmission is limited.

In subframe #k of the second CC, signal transmission may be limited in last M SC-FDMA (single carrier frequency division multiple access) symbols thereof and M may be an integer equal to or greater than 1.

When transmission of at least one of a PUCCH (physical uplink control channel) signal, a PRACH (physical random access channel) signal and an SRS (sounding reference signal) in subframe #k of the second CC is scheduled, transmission of the at least one of the signals in subframe #k of the second CC may be dropped.

The UE may operate on the assumption that a PUSCH (physical uplink shared channel) is not allocated to subframe #k of the second CC irrespective of whether or not the PUSCH has been actually allocated to subframe #k of the second CC.

When a PUSCH signal is transmitted in subframe #k of the second CC, information corresponding to one or more SC-FDMA symbols, included in the PUSCH signal, may be rate-matched or punctured.

Advantageous Effects

According to the present invention, it is possible to efficiently transmit/receive control information in a wireless communication system. Furthermore, it is possible to provide a channel format, a resource allocation scheme and a signal processing method for efficiently transmitting/receiving control information. In addition, it is possible to efficiently allocate resources for transmitting/receiving control information.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIGS. 11 and 12 illustrate subframe reconfiguration schemes according to embodiments of the present invention.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE. While the following description is given, centering on 3GPP LTE/LTE-A for clarity, this is purely exemplary and thus should not be construed as limiting the present invention.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
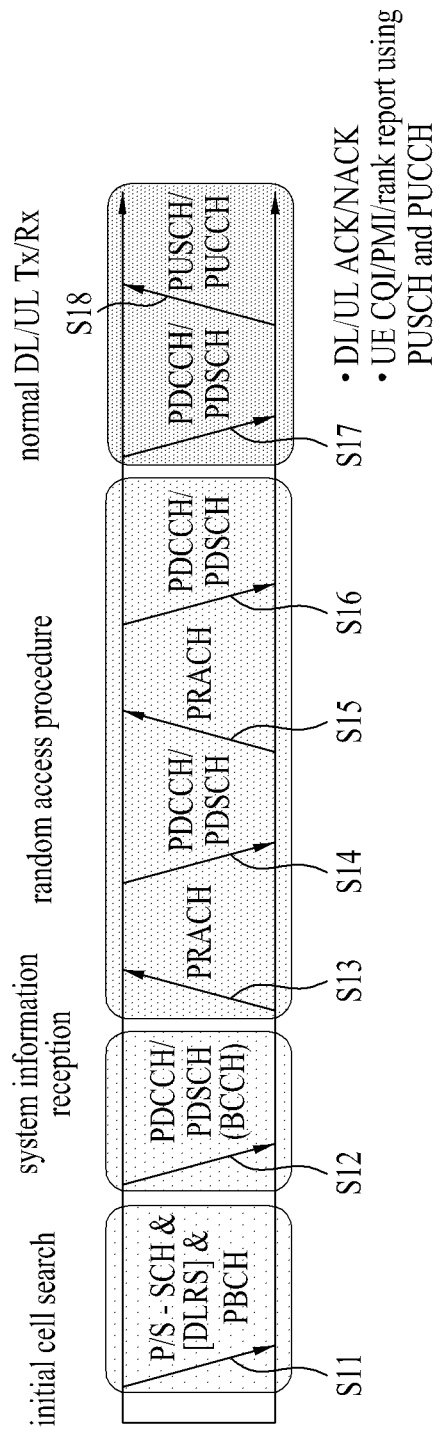
FIG. 1 illustrates physical channels used in a 3GPP LTE system as an exemplary wireless communication system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement(ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
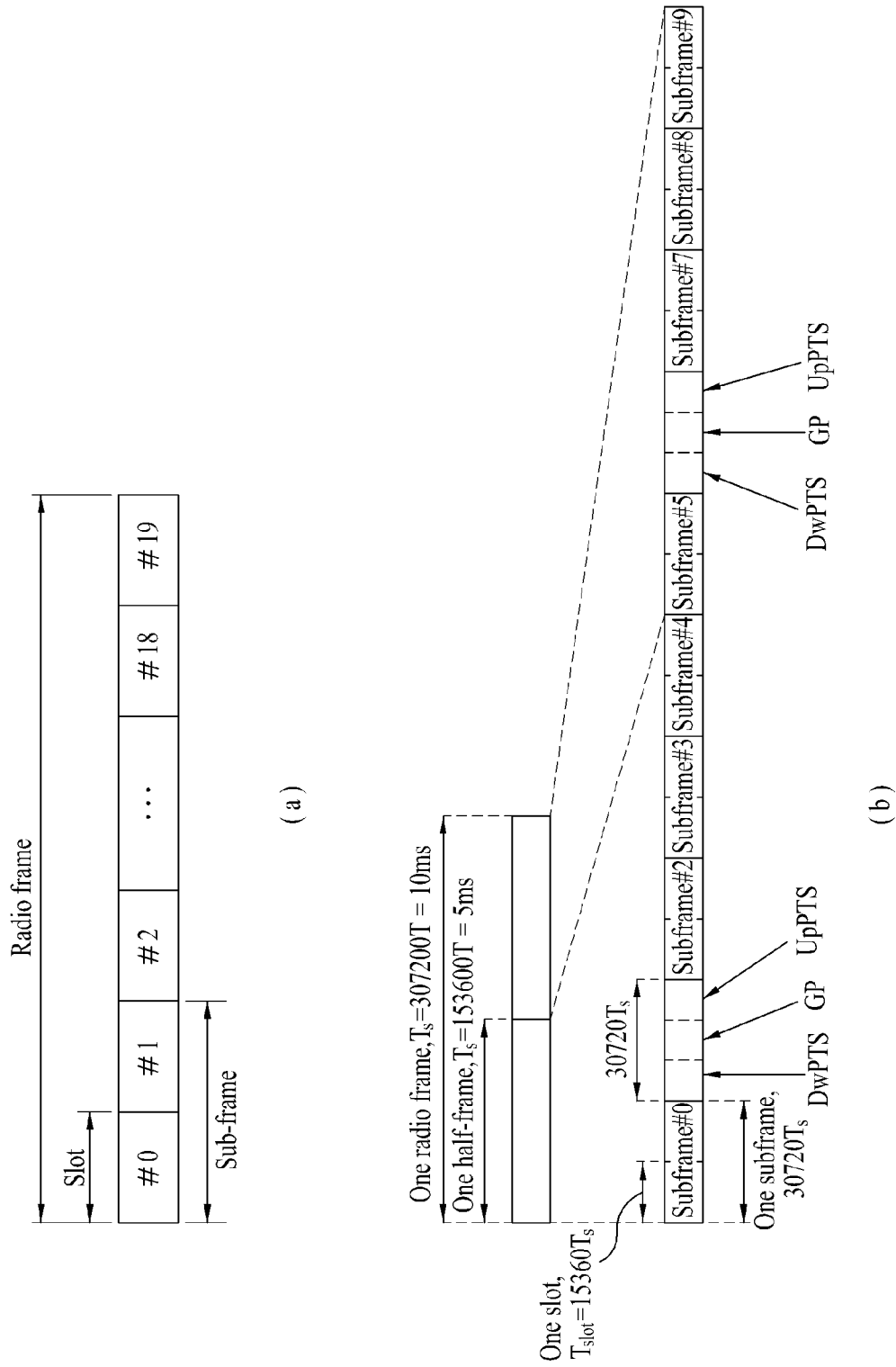
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 1(0) special subframe. Normal subframes are used for an uplink or a downlink according to UL-DL configuration. A subframe includes 2 slots.

Table 1 shows subframe configurations in a radio frame according to UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
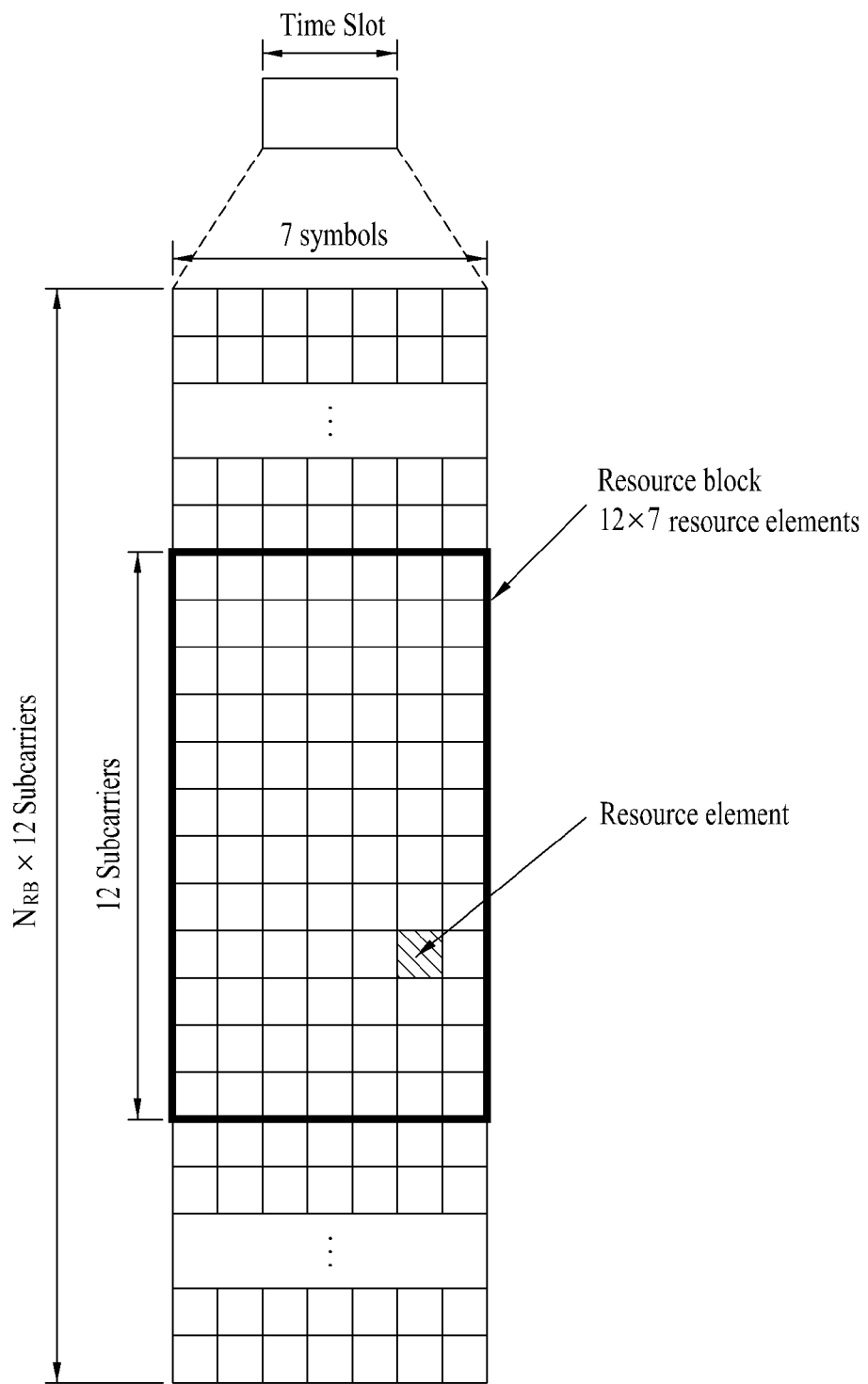
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7(6) REs. The number $N^{DL}$ of RBs included in the downlink slot depends on a downlink transmit bandwidth. The structure of an uplink slot may be same as that of the downlink slot.

Figure 4:
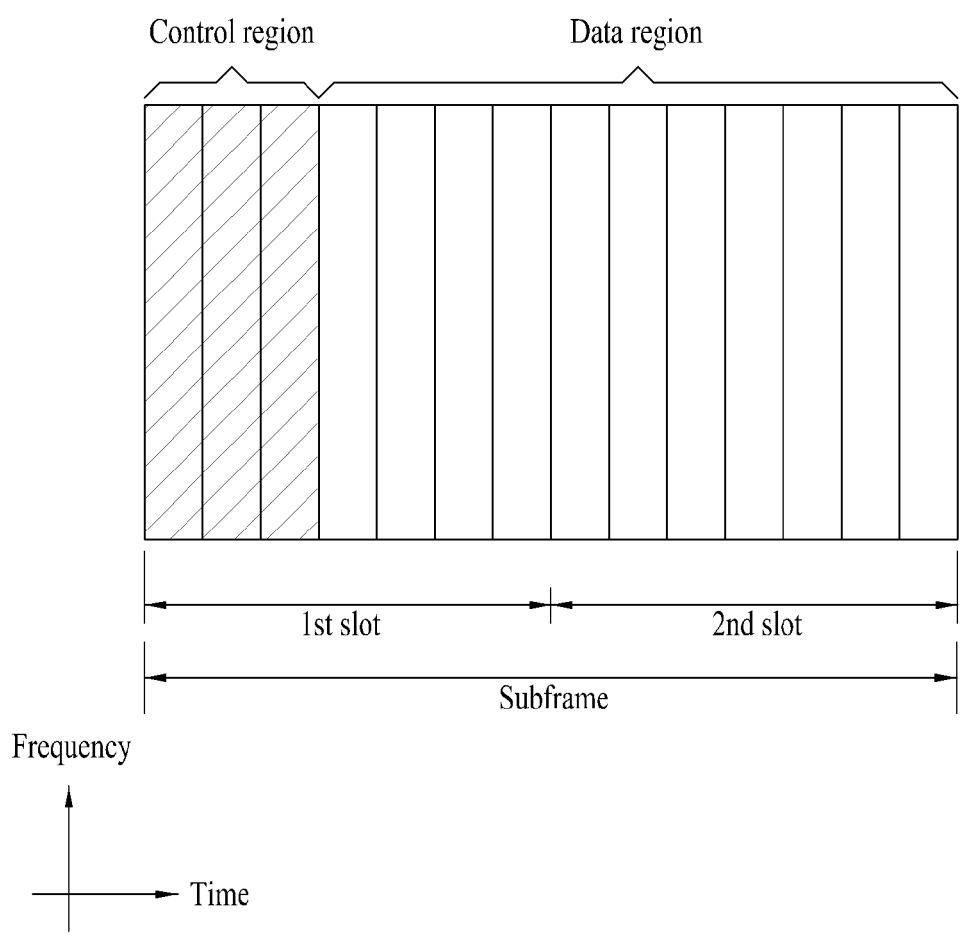
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UIE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
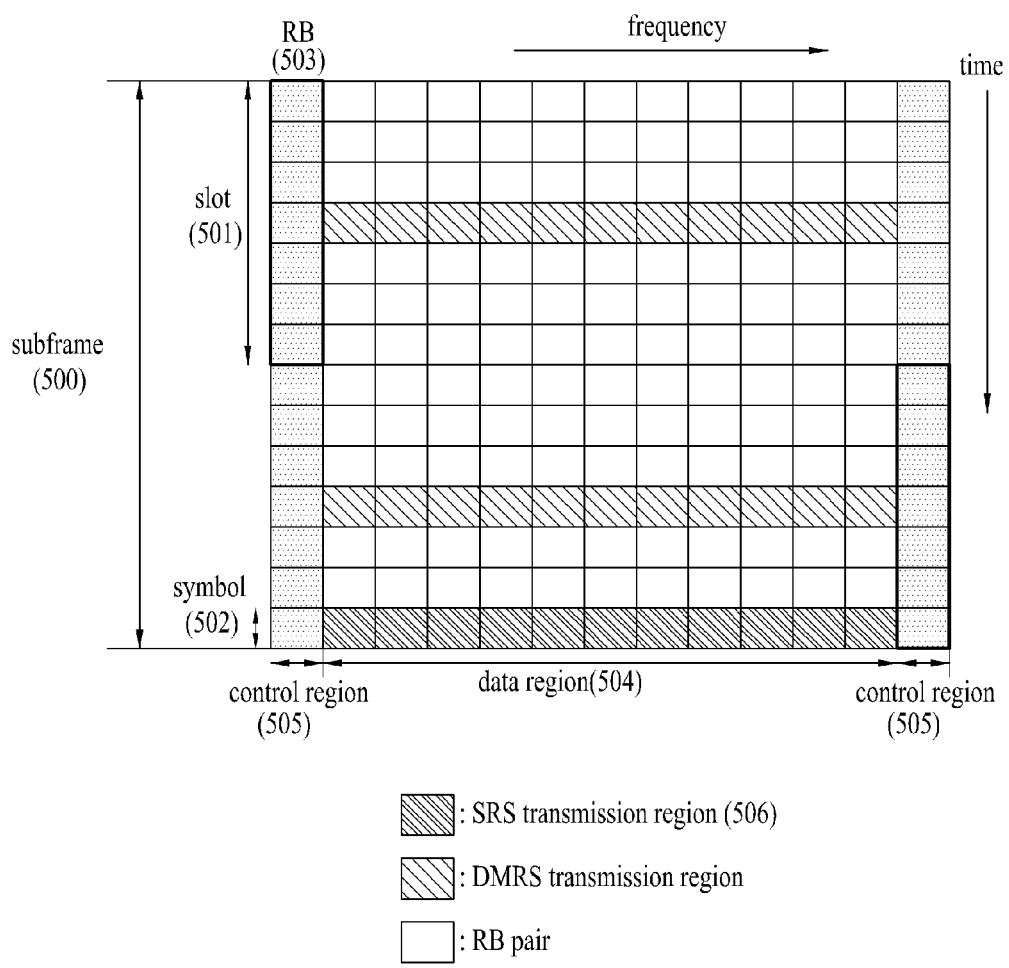
FIG. 5 illustrates an uplink subframe structure.

FIG. 5 illustrates an uplink subframe structure used in LTE.

Referring to FIG. 5, a subframe 500 includes two 0.5 ms slots 501. When a normal CP is used, each slot includes 7 symbols 502 each corresponding to an SC-FDMA symbol. A resource block 503 is a resource allocation unit corresponding to 12 subcarriers in the frequency domain and to a slot in the time domain. The uplink subframe is divided into a data region 504 and a control region 505. The data region refers to a communication resource used for a UE to transmit data such as audio data, packets, etc. and includes a PUSCH (physical uplink shared channel). The control region refers to a communication resource used for the UE to transmit uplink control information (UCI) and includes a PUCCH (physical uplink control channel).

The PUCCH can be used to transmit the following control information.

SR (scheduling request): This is information used to request a UL-SCH resource and is transmitted using On-Off Keying (OOK) scheme.

HARQ ACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ-ACK response includes positive ACK (simply, ACK), negative ACK (NACK), DTX or NACK/DTX. Here, HARQ-ACK is used interchangeably with HARQ ACK/NACK and ACK/NACK.

CSI (channel state information): This is feedback information about a downlink channel. Feedback information regarding multiple input multiple output (MIMO) includes rank indicator (RI) and precoding matrix index (PMI). 20 bits are used for each subframe.

The quantity of control information that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 2 shows the mapping relationship between PUCCH formats and UCI in LTE(-A).

TABLE 2

| PUCCH format | UCI (Uplink Control Information) |
| --- | --- |
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

An SRS is transmitted through the last SC-FDMA symbol of the subframe (506). SRSs of multiple UEs, transmitted through the same SC-FDMA symbol, can be discriminated according to frequency position/sequence. The SRS is transmitted aperiodically or periodically.

Figure 6:
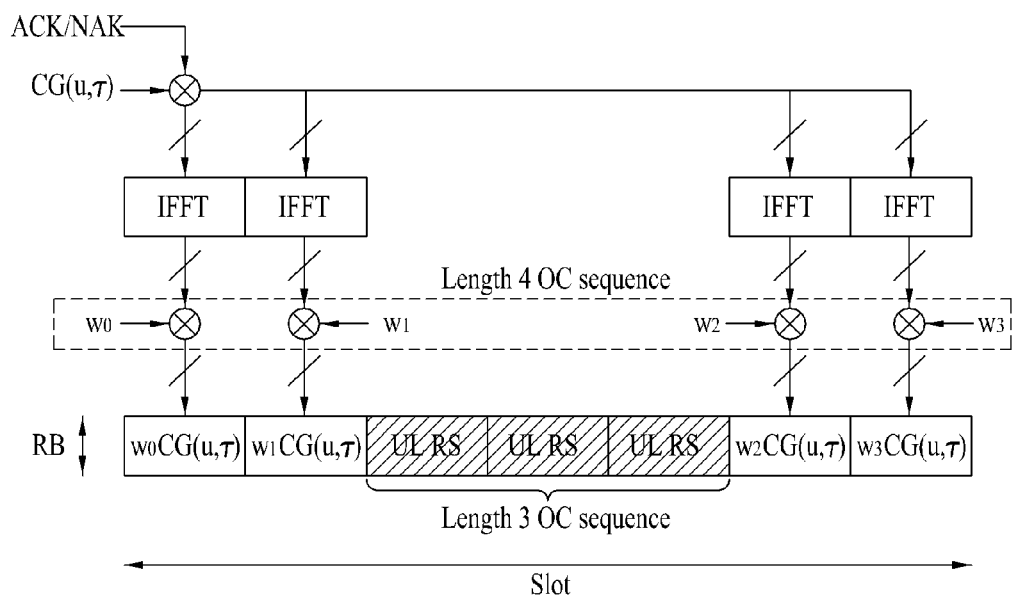
FIG. 6 illustrates a slot level structure of PUCCH format 1a/1b.

FIG. 6 illustrates a slot level structure of PUCCH formats 1a/1b. In the case of PUCCH formats 1a/1b, the same control information is repeated on a slot basis in a subframe. UEs transmit ACK/NACK signals through different resources configured of different cyclic shifts (CSs) (frequency domain codes) of a CG-CAZAC (computer-generated constant amplitude zero auto correlation) sequence and orthogonal covers or orthogonal cover codes (OCs or OCCs) (time domain spreading codes). The OC includes a Walsh/DFT orthogonal code, for example. When the number of CSs is 6 and the number of OCs is 3, 18 UEs can be multiplexed in the same PRB (physical resource block) on the basis of a single antenna.

Figure 7:
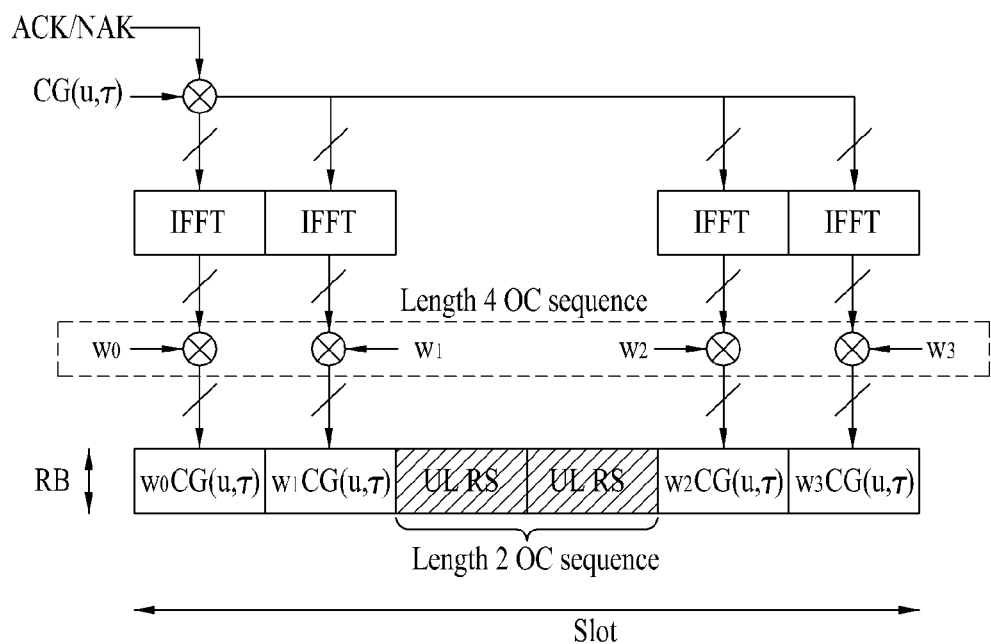
FIG. 7 illustrates a slot level structure of PUCCH format 2/2a/2b.

FIG. 7 illustrates a slot level structure of PUCCH formats 2/2a/2b. A subframe includes 10 QPSK data symbols in addition to a reference signal (RS). Each QPSK symbol is spread according to CS in the frequency domain and then mapped to a corresponding SC-FDMA symbol. The RS can be multiplexed according to CDM using a CS. For example, if the number of available CSs is 12 or 6, 12 or 6 UEs can be multiplexed in the same PRB.

Figure 8:
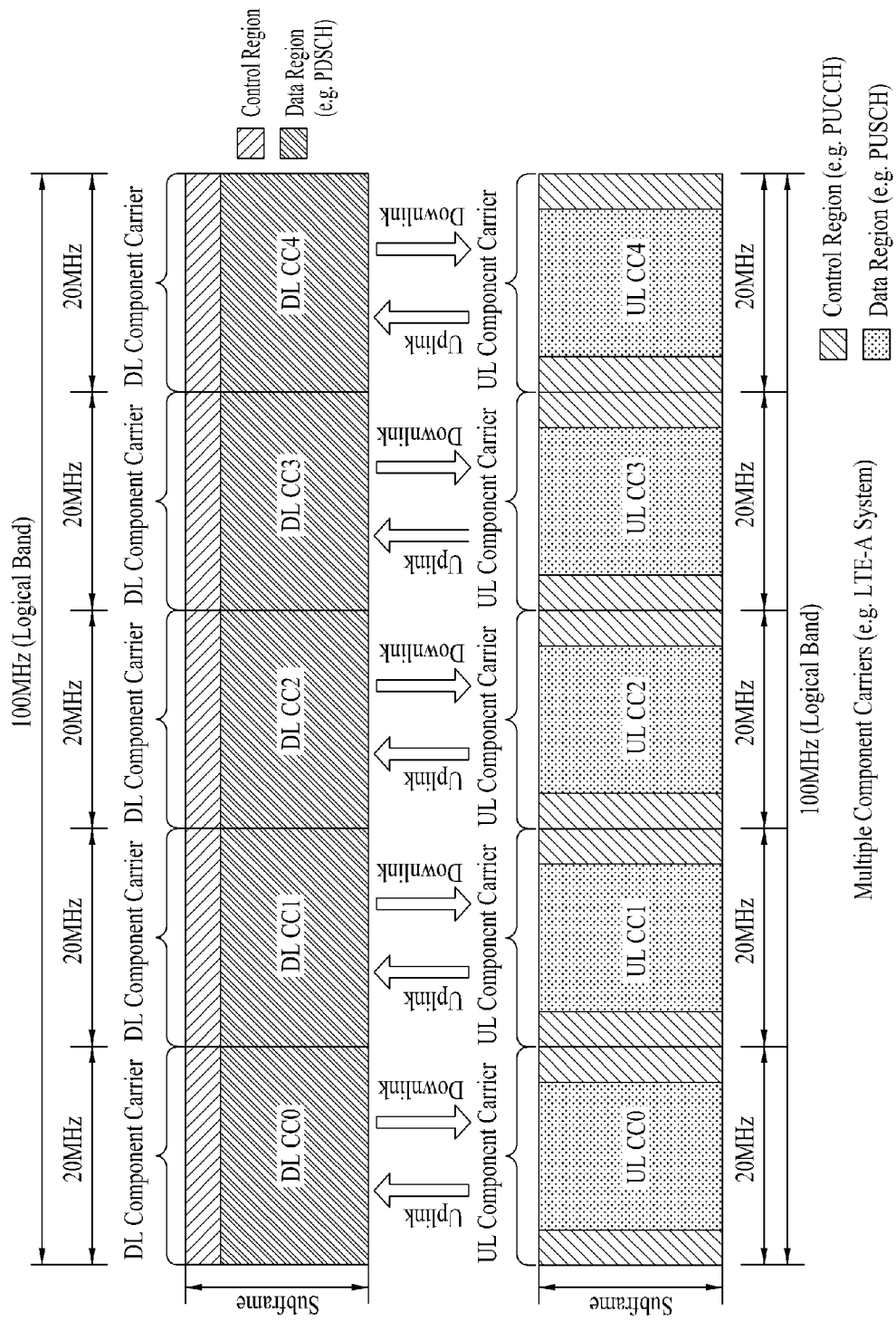
FIG. 8 illustrates a CA (carrier aggregation) communication system.

FIG. 8 illustrates a carrier aggregation (CA) communication system. To support a wider uplink/downlink bandwidth, multiple UL/DL component carriers are aggregated. CCs may be contiguous or non-contiguous in the frequency domain. The bandwidth of each component carrier can be independently determined. Asymmetrical carrier aggregation in which the number of UL CCs is different from the number of DL CCs is possible. Control information may be transmitted and received through a specific CC only. The specific CC may be referred to as a primary CC and other CCs may be referred to as secondary CCs. For example, cross-carrier scheduling (or cross-CC scheduling) is applied, a PDCCH for downlink allocation can be transmitted through DL CC#0 and a PDSCH corresponding to the PDCCH can be transmitted through DL CC#2. The term "component carrier" can be replaced by equivalent terms (e.g. carrier, cell, etc.).

For cross-CC scheduling, a carrier indicator field (CIF) is used. Setting of presence or absence of a CIF in a PDCCH can be enabled through higher layer signaling (e.g. RRC signaling) semi-statically UE-specifically (or UE-group-specifically). PDCCH transmission can be arranged as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have the CIF

CIF is a fixed x-bit field (e.g. x=3) (when the CIF is set).

CIF position is fixed irrespective of DCI format size (when the CIF is set).

When the CIF is present, a BS can allocate a monitoring DL CC (set) in order to reduce BD complexity in a UE. For PDSCH/PUSCH scheduling, the UE can detect/decode a PDCCH only in the corresponding DL CC. The BS can transmit the PDCCH through the monitoring DL CC (set) only. The monitoring DL CC set can be set UE-group-specifically or cell-specifically.

Figure 9:
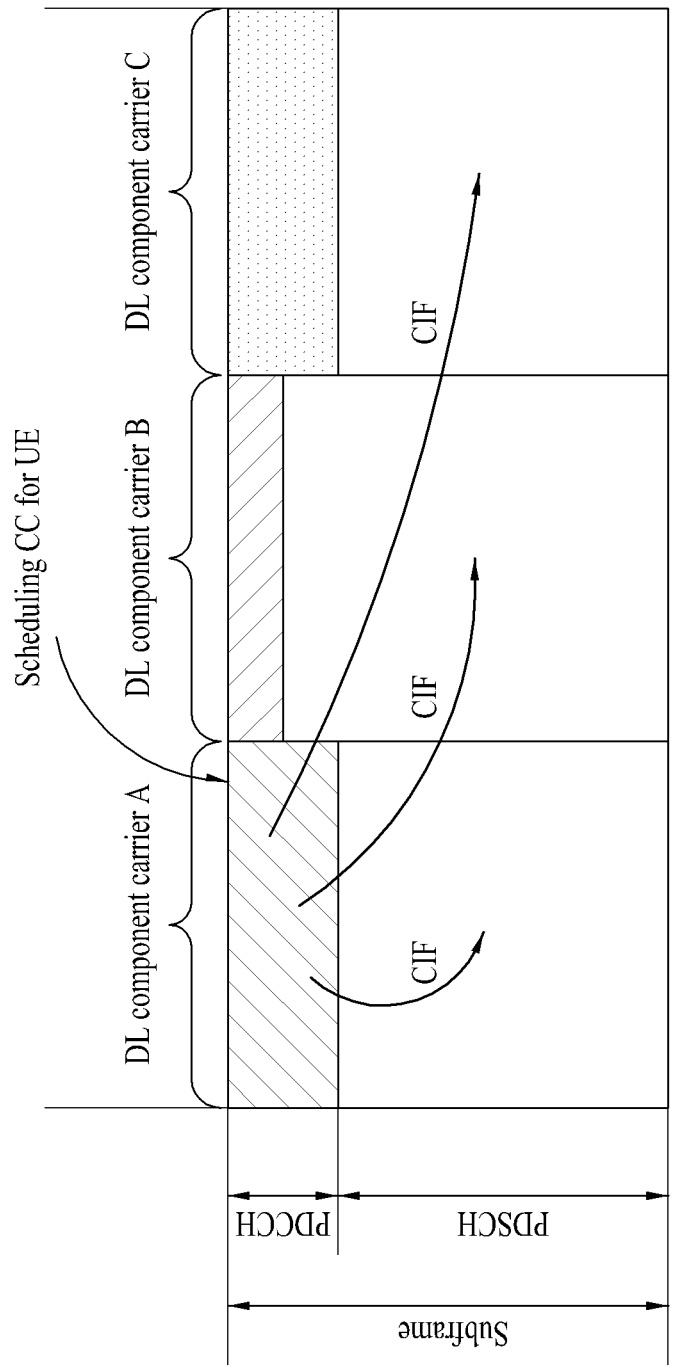
FIG. 9 illustrates cross-carrier scheduling.

FIG. 9 illustrates a case in which 3 DL CCs are aggregated and DL CC A is set as a monitoring DL CC. When the CIF is disabled, each DL CC can transmit a PDCCH that schedules a PDSCH of each DL CC without the CIF according to LTE PDCCH rules. When the CIF is enabled through higher layer signaling, only DL CC A can transmit PDCCHs that schedule PDSCHs of other DL CCs as well as the PDSCH thereof using the CIF. A PDCCH is not transmitted through DL CC B and DL CC C which are not set as a monitoring DL CC. Here, "monitoring DL CC (MCC)" can be replaced by equivalent terms such as a monitoring carrier, monitoring cell, scheduling carrier, scheduling cell, serving carrier, serving cell, etc. A PCC can be referred to as an MCC for scheduling. A DL CC through which a PDSCH corresponding to a PDCCH is transmitted and a UL CC through which a PUSCH corresponding to the PUCCH is transmitted can be referred to as scheduled carriers, scheduled cells, etc.

A beyond LTE-A system based on TDD may consider aggregation of a plurality of CCs in different UL-DL configurations. In this case, different A/N timings (i.e. UL SF timing at which A/N with respect to DL data transmitted through each DL SF is transmitted) may be set for a PCC and an SCC according to UL-DL configurations of the corresponding CCs. For example, UL SF timing at which A/N is transmitted for the same DL SF timing (DL data transmitted at the DL SF timing) can be set differently for the PCC and SCC, and a DL SF group for which A/N feedback is transmitted at the same UL SF timing can be set differently for the PCC and the SCC. Furthermore, link directions (i.e. DL or UL) of the PCC and the SCC may be set differently in the same SF timing. For example, the SCC can be set as UL SF at a specific SF timing, whereas the PCC can be set as DL SF at the specific SF timing.

In addition, the beyond LTE-A system based on TDD may support cross-CC scheduling in a CA situation based on different TDD UL-DL configurations (referred to as different TDD CA for convenience). In this case, different UL grant timings (DL SF timing at which a UL grant that schedules UL transmission is transmitted) and different PHICH timings (DL SF timing at which a PHICH corresponding to UL data is transmitted) may be set for an MCC (monitoring CC) and an SCC. For example, a DL SF in which a UL grant/PHICH is transmitted can be set differently for the same UL SF. Furthermore, a UL SF group for which a UL grant or PHICH feedback is transmitted in the same DL SF can be set differently for the MCC and the SCC. In this case, link directions of the MCC and the SCC may be set differently for the same SF timing. For example, specific SF timing can be set to a DL SF in which a UL grant/PHICH will be transmitted in case of the SCC, whereas the specific SF timing can be set to a UL SF in case of the MCC.

When SF timing (referred to as collided SF hereinafter) at which link directions of the PCC and SCC are different from each other due to different TDD CA configurations is present, only a CC of the PCC and SCC, which has a specific link direction or has the same link direction as that of a specific CC (e.g. PCC), can be handled as operable at the SF timing due to hardware configuration of the UE or for other reasons/purposes. This scheme is called HD (Half-Duplex)-TDD CA for convenience. For example, when SF collision occurs because specific SF timing is set to a DL SF in case of PCC and the SF timing is set to a UL SF in case of SCC, only a PCC (i.e. DL SF set to the PCC) corresponding to DL at the SF timing is handled as operable and an SCC (i.e. UL SF set to the SCC) corresponding to UL is not handled as operable at the SF timing (and vice versa).

Figure 10:
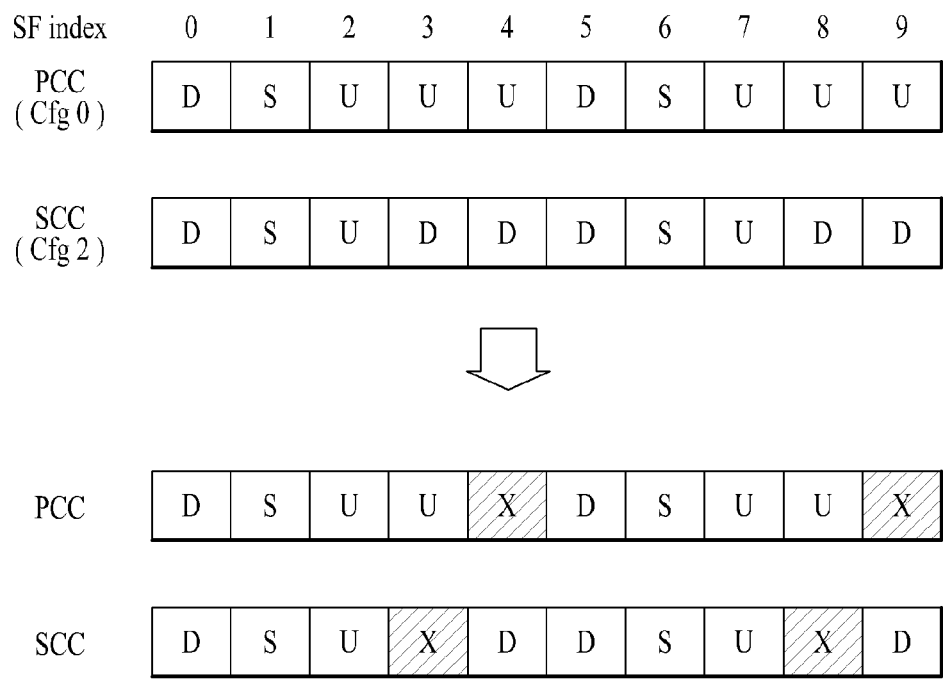
FIG. 10 illustrates half duplex (HD) type TDD based carrier aggregation.

FIG. 10 illustrates a HD-TDD CA structure. In the figure, shaded parts X show a CC (link direction) that are restricted from being used in a collided SF. Referring to FIG. 10, when a PCC is set to a UL SF and an SCC is set to a DL SF, only the UL SF of the PCC may be handled as operable and the DL SF of the SCC may not be handled as operable. In the same situation, only the DL SF of the SCC may be handled as operable and the UL SF of the PCC may not be handled as operable.

A description will be given of a subframe operation method for supporting HD operation efficiently and stably when plural CCs in different TDD UL-DL configurations are aggregated. Specifically, a method of reconfiguring an SF type for stable HD operation when only a specific (DL or UL) direction is handled as operable for each collided SF combination, in consideration of all possible collided SF combinations between an XCC (PCC or SCC) and a YCC (SCC or PCC), is proposed. In addition, an efficient link direction configuration scheme for each collided SF combination is proposed to minimize resource loss (caused by collided SFs) in terms of SF usage.

In the specification, (X1, X2:Y1, Y2) represents that the directions of the first and second SFs (in a time order) of the XCC respectively correspond to X1 and X2 and the directions of the first and second SFs of the YCC respectively correspond to Y1 and Y2. In addition, D, U and S respectively denote a DL SF, a UL SF and a special SF, and X denotes a CC (link direction) that is not used (in a collided SF). In addition, for any reason, only the SCC may be set to X (i.e. the PCC may not be set to X).

A detailed description will be given of collided SF combinations.

Case #1: (X1, X2:Y1, Y2)=(U, D:U, U)

SF recfg 1-1: (U, D:U, U) is set to (U, D:U, X).

When the second SF direction of the XCC is set to D, a transmission/reception timing gap is present between U and D of the XCC and thus the entire transmission period can be secured in the first U of the YCC. That is, when a UL transmission timing synchronization (e.g. timing advance) difference between the XCC and YCC is insignificant, transmission end timing in the first U of the YCC is present within the transmission/reception timing gap of the XCC (i.e. present sufficiently prior to reception start timing in D of the XCC). Accordingly, link direction setting of this scheme is useful in terms of resource utilization efficiency.

SF recfg 1-2: (U, D:U, U) is set to (U, X:U, U).

When the second SF direction of the YCC is set to U, the entire transmission period can be secured in the first U of the XCC because two SFs of the YCC are contiguous Us. That is, the entire transmission period can be maintained without loss in the first U of the XCC since only transmission operation through U is continuously performed without transmission/reception switching in the YCC. Accordingly, link direction setting of the present scheme is useful in terms of resource utilization efficiency.

According to SF recfg 1-1, the transmission end timing in the first U of the YCC may not be present sufficiently prior to the reception start timing in the D of the XCC due to a significant UL transmission timing synchronization difference between the XCC and the YCC. In this case, the transmission end timing in the first U of the YCC may need to be adjusted such that transmission/reception switching time between U and D of the XCC is secured (i.e. the transmission end timing in the first U of the YCC becomes similar or corresponds (in the worst case) to the transmission end timing in U of the XCC). This reduces an SF period in which transmission can be performed through the first U of the YCC and thus resource utilization efficiency may decrease.

Therefore, when a link direction is configured according to SF recfg 1-1, the following SF type reconfiguration scheme can be considered for Y1=U of the YCC.

Sol 1: A BS can signal, to a UE, an SF period with respect to U, the number of symbols (constituting an SF), the last symbol index (in the SF) or information through which the same can be inferred. The UE can signal, to the BS, an SF period in which transmission can be performed for Y1=U of the YCC, the number of symbols (constituting an SF), the last symbol index (in the SF) or information through which the same can be inferred. Here, a UL symbol includes an SC-FDMA symbol. Accordingly, the UE can perform UL transmission only in an available SF period and then carry out transmission/reception switching operation at an appropriate time. When YCC=PCC, a shortened PUCCH format may be used for transmission of UCI such as ACK/NACK, CSI, etc. through Y1=U. Here, the shortened PUCCH format refers to a PUCCH format in which UL signal transmission is performed using only symbols other than symbols available for SRS transmission in an SF. In the meantime, transmission of a UL signal/channel (e.g. a PUCCH, random access preamble, SRS), which is configured/ordered to include all or some remaining symbol(s) except for an available SF period in an SF, can be dropped/abandoned. When a PUSCH is transmitted through Y1=U of the YCC, the PUSCH can be rate-matched or punctured in consideration of the available SF period (and/or symbol(s) other than the available SF period).

Sol 2: Only U and D of the XCC can be operated by limiting use of Y1=U of the YCC (i.e. (U, D:U, U) is set to (U, D:X, X)). Equivalently, the UE can operate on the assumption that a PUSCH transmission in Y1=U of the YCC is not scheduled. That is, the UE may not transmit the PUSCH in Y1=U of the YCC irrespective of whether the PUSCH transmission in Y1=U of the YCC has been scheduled or not. Accordingly, the UE can omit/drop/abandon PUSCH transmission in Y1=U of the YCC even though PUSCH transmission is scheduled. Furthermore, the UE can omit/drop/abandon transmission of a PUCCH/PRACH/SRS configured to be transmitted in Y1=U of the YCC.

Sol 3: Use of last M (SC-FDMA) symbols of Y1=U of the YCC can be additionally limited. M is an integer equal to or greater than 1, for example, 1. Transmission of a UL signal/channel (e.g. periodic SRS, aperiodic SRS, PUCCH (format 2/2a/2b) carrying periodic CSI, random access preamble), which is configured/ordered to be include all or some of the M symbol(s), can be dropped/abandoned. When a PUSCH is transmitted in Y1=U of the YCC, the PUSCH can be rate-matched or punctured in consideration of the M symbols. When a PUCCH (e.g. PUCCH carrying ACK/NACK) is transmitted in Y1=U of the YCC, the PUCCH can be configured to use a shortened PUCCH format in which a signal is transmitted using symbols other than the M symbols. The UE can be configured to omit/drop/abandon transmission of a PUCCH/PRACH/SRS configured to be transmitted in Y1=U of the YCC.

Sol 4: When a PUSCH is transmitted in Y1=U of the YCC, the UE can apply rate matching or puncturing to some last (e.g. M) symbols constituting the PUSCH. In addition, the UE can omit/drop/abandon transmission of a PUCCH/PRACH/SRS configured to be transmitted in Y1=U of the YCC.

Case #2: (X1, X2:Y1, Y2)=(D, D:S, U)

SF recfg 2-1: (D, D:S, U) is set to (D, D:S, X).

When the second SF direction of the XCC is set to D, the entire reception period (i.e. the entire DwPTS period) can be secured in Y1=S of the YCC since two SFs of the XCC are contiguous Ds. That is, the entire reception period can be maintained without loss in Y1=S of the YCC since only reception operation through D is continuously performed without transmission/reception switching in the XCC. Accordingly, link direction setting of the present scheme is useful in terms of resource utilization efficiency. UL transmission in an UpPTS period set in Y1=S of the YCC can be dropped. For example, transmission of a UL signal/channel (e.g. periodic SRS, aperiodic SRS, random access preamble), configured/ordered to be transmitted in Y1=S (i.e. UpPTS period) of the YCC, can be dropped/abandoned.

SF recfg 2-2: (D, D:S, U) is set to (D, X:S, U).

When the second SF direction of the YCC is set to U, the entire reception period cannot be secured in X1=D of the XCC because a transmission/reception switching gap is present between S and U of the YCC. That is, reception end timing in X1=D of the XCC may need to be adjusted such that transmission/reception switching time of the YCC is secured for HD operation even if DL reception timing of the XCC is synchronized with DL reception timing of the YCC. That is, the reception end timing in X1=D of the XCC may need to be controlled to be similar to or to correspond to (in the worst case) reception end timing in Y1=S of the YCC. This may reduce an SF period in which reception can be performed through X1=D of the XCC, and thus resource utilization efficiency may decrease.

When a link direction setting scheme such as SF recfg 2-2 is applied, the following SF type resetting scheme may be applied to X1=D of the XCC. This scheme can be applied when a UL signal/channel is transmitted through UpPTS of Y1=S and/or a UL signal/channel is transmitted through Y2=U.

Alt 1: The BS can signal, to the UE, an SF period with respect to X1=D of the XCC, the number of symbols (constituting an SF), the last symbol index (in the SF) or information through which the same can be inferred. The UE can signal, to the BS, an SF period in which reception can be performed for X1=D of the XCC, the number of symbols (constituting an SF), the last symbol index (in the SF) or information through which the same can be inferred. Here, a DL symbol includes an OFDM symbol. Accordingly, the UE can perform DL reception only in an available SF period and then carry out transmission/reception switching operation at an appropriate time.

Alt 2: The same SF structure as S (i.e. S configured based on a special SF configuration which is set for the YCC) configured in the YCC can be applied to X1=D of the XCC. For example, only part corresponding to DL in S of the YCC can be applied to X1=D of the XCC.

Alt 3: The same SF structure as S (i.e. S configured based on a special SF configuration which is set for the XCC) configured in the XCC can be applied to X1=D of the XCC. For example, only part corresponding to DL in S of the XCC can be applied to X1=D of the XCC.

Alt 4: S corresponding to a smallest DL region between S configured in the XCC and S configured in the YCC can be applied to X1=D of the XCC. For example, only part corresponding to DL in the corresponding S can be applied to X1=D of the XCC.

Alt 5: A special SF configuration to be applied to X1=D of the XCC is additionally signaled and an S structure based on the special SF configuration is applicable to X1=D of the XCC. For example, only part corresponding to DL in the corresponding S can be applied to X1=D of the XCC.

Alt 6: Use of X1=D of the XCC can be additionally limited (i.e. (D, D:S, U) is set to (X, X:S, U) such that only S and U of the YCC are operated). Equivalently, the UE can operate on the assumption that a PCFICH/PHICH/PDCCH and a PDSCH transmission in X1=D of the XCC are not scheduled. That is, the UE can omit/drop/abandon a process for receiving scheduling information regarding the PCFICH/PHICH/PDCCH and PDSCH in X1=D of the XCC irrespective of whether the BS has transmitted the signals or not.

Alt 7: An S structure corresponding to a smallest DL region (i.e. DwPTS period) can be applied to X1=D of the XCC. For example, only part corresponding to DL in the corresponding S can be applied to X1=D of the XCC. Otherwise, the UE can operate on the assumption that a PDSCH (e.g. DL grant PDCCH) is not scheduled in X1=D of the XCC. That is, the UE can omit/drop/abandon a process for receiving a DL grant PDCCH signal and a PDSCH signal corresponding thereto in X1=D of the XCC irrespective of whether the BS has actually transmitted the signals or not.

Alt 8: When a PDSCH is transmitted/received through X1=D of the XCC, the UE can omit an operation of detecting/receiving some (e.g. K) last DL symbols constituting the PDSCH. Here, a DL symbol includes an OFDM symbol.

When Alts 1 to 8 are applied, use of a UpPTS period (i.e. SC-FDMA symbols corresponding thereto) set in Y1=S of the YCC can be additionally limited to sufficiently secure a DL reception period in X1=D of the XCC. Here, UL transmission through the UpPTS period (i.e. transmission of a UL signal/channel (e.g. periodic SRS, aperiodic SRS, random access preamble) configured/ordered to be transmitted through the UpPTS period) in Y1=S of the YCC can be omitted/dropped. In the case of Alts 2, 3 and 4, a period corresponding to the sum of the DwPTS period configured in the YCC or XCC and the UpPTS period configured in the YCC or the sum of the smallest DwPTS period between the DwPTS periods configured in the YCC/XCC and the UpPTS period configured in the YCC can be determined as the entire DL reception period in X1=D of the XCC. Here, UL transmission in the UpPTS period in Y1=S of the YCC can be set through RRC signaling.

Alternatively, when the link direction setting scheme such as SF recfg 2-2 is applied, the following SF type resetting scheme for Y2=U of the YCC is proposed to maintain the entire DL reception period of X1=D of the XCC without loss. Here, for Y1=S of the YCC, only the DwPTS period configured in the corresponding S is applied (i.e. DL reception operation in the corresponding period is performed) and use of the UpPTS period configured in the corresponding S (UL transmission operation in the corresponding period) can be omitted. This is applicable to a case in which a DL signal/channel is transmitted through X1=D of the XCC.

Alt 9: The BS can signal, to the UE, an SF period with respect to Y2=U of the YCC, the number of symbols (constituting an SF), the first symbol index (in the SF) or information through which the same can be inferred. The UE can signal, to the BS, an SF period in which transmission can be performed for Y2=U of the YCC, the number of symbols (constituting an SF), the first symbol index (in the SF) or information through which the same can be inferred. Here, a UL symbol includes an SC-FDMA symbol. Accordingly, the UE can perform UL transmission only in an available SF period. In the meantime, transmission of a UL signal/channel (e.g. a PUCCH, random access preamble, SRS), which is configured/instructed to include all or some remaining symbol(s) except for an available SF period in an SF and to be transmitted, can be dropped/abandoned. When a PUSCH is transmitted through Y2=U of the YCC, the PUSCH can be rate-matched or punctured in consideration of the available SF period (and/or symbols other than the available SF period).

Alt 10: Only D of the XCC and S of the YCC can be operated by additionally limiting use of Y2=U of the YCC (i.e. (D, D:S, U) is set to (D, X:S, X)). Equivalently, the UE can operate on the assumption that a PUSCH transmission in Y2=U of the YCC is not scheduled. That is, the UE may not transmit the PUSCH in Y2=U of the YCC irrespective of whether the PUSCH transmission in Y2=U of the YCC has been scheduled or not. Accordingly, the UE can omit/drop/abandon PUSCH transmission in Y2=U of the YCC even though PUSCH transmission is scheduled. Furthermore, the UE can omit/drop/abandon transmission of a PUCCH/PRACH configured to be transmitted through Y2=U of the YCC.

Alt 11: Use of first L (SC-FDMA) symbols of Y2=U of the YCC can be additionally limited. Transmission of a UL signal/channel (e.g. PUCCH, random access preamble), which is configured/ordered to be transmitted including all or some of the L symbols, can be dropped/abandoned. When a PUSCH is transmitted in Y2=U of the YCC, the PUSCH can be rate-matched or punctured in consideration of the L symbols. The UE can omit/drop/abandon transmission of a PUCCH/PRACH configured to be transmitted in Y2=U of the YCC.

Alt 12: When a PUSCH is transmitted in Y2=U of the YCC, the UE can apply rate matching or puncturing to some (e.g. L) first symbols constituting the PUSCH. In addition, the UE can omit/drop/abandon transmission of a PUCCH/PRACH configured to be transmitted in Y2=U of the YCC.

As alternative scheme for configuring a link direction, such as SF recfg 2-1, the methods of Alts 1 to 8 may be applicable in order to support a UpPTS period (i.e. UL transmission in the corresponding period) which is configured in Y1=S of the YCC.

Considering SF resource utilization efficiency, SF recfg 1-1 or SF recfg 1-2 is applicable to Case #1 and only SF recfg 2-1 may be applicable to Case #2. In addition, only SF recfg 1-2 may be applicable to Case #1 and only SF recfg 2-1 may be applicable to Case #2 even in consideration of a UL transmission timing synchronization difference between CCs.

Based on the above-described proposed schemes, a scheme of configuring link direction when two or more continuous SFs form a collided SF is described.

In the following description, (X1, X2, X3:Y1, Y2, Y3) represents that first, second and third SF directions (in a time order) of the XCC respectively correspond to X1, X2 and X3 and first, second and third SF directions of the YCC respectively correspond to Y1, Y2 and Y3. Similarly, (X1, X2, X3, X4:Y1, Y2, Y3, Y4) represents that first, second, third and fourth SF directions (in chronological order) of the XCC respectively correspond to X1, X2, X3 and X4 and first, second, third and fourth SF directions of the YCC respectively correspond to Y1, Y2, Y3 and Y4.

Case #3: (X1, X2, X3:Y1, Y2, Y3)=(U, D, D:U, U, U)
SF recfg 3-1: (U, D, D:U, U, U) is set to (U, D, D:U, X, X).
This scheme is identical/similar to SF recfg 1-1. Sols 1 to 4 are applicable to Y1=U.

SF recfg 3-2: (U, D, D:U, U, U) is set to (U, X, X:U, U, U).
This scheme is identical/similar to SF recfg 1-2.

SF recfg 3-3: (U, D, D:U, U, U) is set to (U, D, X:U, X, U).
It is necessary to secure a transmission/reception switching gap between X2=D and Y3=U for HD operation. To achieve this, Alts 1 to 12 are applicable to X2=D (or Y3=U). In addition, Sols 1 to 4 are applicable to Y1=U.

SF recfg 3-4: (U, D, D:U, U, U) is set to (U, X, D:U, U, X).
A transmission/reception timing gap may be present between Y2=U and X3=D. In addition, Sols 1 to 4 are applicable to Y2=U.

Case #4: (X1, X2, X3:Y1, Y2, Y3)=(D, D, D:S, U, U)
SF recfg 4-1: (D, D, D:S, U, U) is set to (D, D, D:S, X, X).
This scheme is identical/similar to SF recfg 2-1. Alts 1 to 8 are applicable to X1=D.

SF recfg 4-2: (D, D, D:S, U, U) is set to (D, X, X:S, U, U).
This scheme is identical/similar to SF recfg 2-2. Alts 1 to 12 are applicable to X1=D (or Y2=D).

SF recfg 4-3: (D, D, D:S, U, U) is set to (D, D, X:S, X, U).
It is necessary to secure a transmission/reception switching gap between X2=D and Y3=U for HD operation. To achieve this, Alts 1 to 12 are applicable to X2=D (or Y3=U).

SF recfg 4-4: (D, D, D:S, U, U) is set to (D, X, D:S, U, X).
Since a transmission/reception timing gap is present between Y2=U and X3=D, there is no SF resource loss with respect to Y2 and X3. Alts 1 to 12 can be applied to X1=D (or Y2=U) in order to secure a transmission/reception switching gap between X1=D and Y2=U. In addition, Sols 1 to 4 are applicable to Y2=U.

Case #5: (X1, X2, X3, X4:Y1, Y2, Y3, Y4)=(D, D, D, D:S, U, U, D)
SF recfg 5-1: (D, D, D, D:S, U, U, U) is set to (D, D, D, D:S, X, X, X).
This scheme is identical/similar to SF recfg 2-1. Alts 1 to 8 are applicable to X1=D.

SF recfg 5-2: (D, D, D, D:S, U, U, U) is set to (D, X, X, X:S, U, U, U).
This scheme is identical/similar to SF recfg 2-2. Alts 1 to 12 are applicable to X1=D (or Y2=D).

SF recfg 5-3: (D, D, D, D:S, U, U, U) is set to (D, D, D, X:S, X, X, U).
It is necessary to secure a transmission/reception switching gap between X3=D and Y4=U for HD operation. To achieve this, Alts 1 to 12 are applicable to X3=D (or Y4=U).

SF recfg 5-4: (D, D, D, D:S, U, U, U) is set to (D, X, D, D:S, U, X, X).
To secure a transmission/reception switching gap between X1=D and Y2=U, Alts 1 to 12 are applicable to X1=D (or Y2=U). Furthermore, Sols 1 to 4 are applicable to Y2=U.

SF recfg 5-5: (D, D, D, D:S, U, U, U) is set to (D, D, X, D:S, X, U, X).
It is necessary to secure a transmission/reception switching gap between X2=D and Y3=U for HD operation. To achieve this, Alts 1 to 12 are applicable to X2=D (or Y3=U). In addition, Sols 1 to 4 are applicable to Y3=U.

SF recfg 5-6: (D, D, D, D:S, U, U, U) is set to (D, X, X, D:S, U, U, X).
To secure a transmission/reception switching gap between X1=D and Y2=U, Alts 1 to 12 are applicable to X1=D (or Y2=U). Furthermore, Sols 1 to 4 are applicable to Y3=U.

SF recfg 5-7: (D, D, D, D:S, U, U, U) is set to (D, D, X, X:S, X, U, U).

It is necessary to secure a transmission/reception switching gap between X2=D and Y3=U for HD operation. To achieve this, Alts 1 to 12 are applicable to X2=D (or Y3=U).

SF recfg 5-8: (D, D, D, D:S, U, U, U) is set to (D, X, D, X:S, U, X, U).
It is necessary to secure a transmission/reception switching gap between X1=D and Y2=U and between X3=D and Y4=U for HD operation. To achieve this, Alts 1 to 12 are applicable to X1=D (or Y2=U) and X3=D (or Y4=U).

Considering SF resource utilization efficiency, SF recfg 3-1, SF recfg 3-2 or SF recfg 3-4 may be applicable to Case #3, only SF recfg 4-1 may be applicable to Case #4 and only SF recfg 5-1 may be applicable to Case #5. In addition, only SF recfg 3-2 may be applicable to Case #3, only SF recfg 4-1 may be applicable to Case #4 and only SF recfg 5-1 may be applicable to Case #5 even in consideration of a UL transmission timing synchronization difference between CCs. Furthermore, it is possible to exclude only SF recfg 5-8 which is expected to require a largest SF resource loss for securing a transmission/reception switching gap from among the above-described schemes.

FIGS. 11 and 12 illustrate SF reconfiguration methods according to embodiments of the present invention. The SF reconfiguration methods correspond to generalization of Sols 1 to 4 and Alts 1 to 12. In FIGS. 11 and 12, (X(k), X(k+1):Y(k), Y(k+1)) represents that a k-th and (k+1)-th SF directions (in a time order) of the XCC respectively correspond to X(k) and X(k+1) and a k-th and (k+1)-th SF directions of the YCC respectively correspond to Y(k) and Y(k+1).

Referring to FIG. 11, SF reconfiguration is performed as follows when a collided SF occurs. FIG. 11 shows a state after the collided SF has been reconfigured.

(X(k), X(k+1):Y(k), Y(k+1))=>(U, D:U, X) or (X, D:U, X)
Sols 1 to 4 may be applicable to Y(k)=U. UCI including ACK/NACK and CSI is transmitted on a PCC, and thus a SF recfg (Sols 1 to 4 may need to be applied) may be permitted only for YCC=SCC and not permitted for YCC=PCC.

Referring to FIG. 12, SF reconfiguration is performed as follows when a collided SF is generated. FIG. 12 shows a state after the collided SF has been reconfigured.

(X(k), X(k+1):Y(k), Y(k+1))=>(D, X:S, U) or (D, X:X, U)
Alts 1 to 12 may be applicable to X(k)=D (or Y(k+1)=U). System information, RRC/NAC signal and synchronization signal are transmitted on the PCC, and thus an SF recfg (Alts 1 to 12 need to be applied) may be permitted only for XCC=SCC and not permitted for XCC=PCC.

In addition, when SF recfg 2-1 (i.e. X1, X2:Y1, Y2)=>(D, D:S, X)) is applied to Case #2, use of the entire period of Y1=S (including both DwPTS and UpPTS) can be additionally limited in order to support a DL SF period of the XCC without loss. That is, only two Ds of the XCC can be operated for two corresponding SFs by setting (X1, X2:Y1, Y2) to (D, D:X, X). Otherwise, the UE can operate on the assumption that a PCFICH/PHICH/PDCCH and a PDSCH transmission in Y1=S (as well as a UL signal/channel transmitted through UpPTS) are not scheduled.

In the following cases, situations/operations similar to Case #1 and Case #2 may occur. In this case, Sols 1 to 4 and Alts 1 to 12 may be applicable according to conditions.

Case #A: (X1, X2:Y1, Y2)=(D, S:D, D) or (D, X:D, D)
The relationship between X2=S and Y2=D may be similar to the relationship between X1=D and Y1=S of Case #2 (which can be set to (D, X:D, D). Accordingly, an SF reconfiguration method according to SF recfg 2-1 and SF recfg 2-2 is applicable. For example, Alts 1 to 8 or modified/extended methods thereof are applicable to Y2=D according to whether use of the entire period of X2=S or an UpPTS period in the corresponding S is limited or not.

Case #B: (X1, X2:Y1, Y2)=(U, D:D, D), (U, D:X, D) or (X, D:D, D)

The relationship between X1=U and Y2=D may be similar to the relationship between X2=D and Y1=U of Case #1 (which can be set to (U, D:X, D) or (X, D:D, D). Accordingly, an SF reconfiguration method related to SF recfg 1-1 is applicable (to a case in which (X1, X2:Y1, Y2) is set to (U, D:X, D)). For example, Sols 1 to 4 may be applicable to X1=U.

Furthermore, it is possible to configure a scheme for the UE as one of Sols 1 to 4 and/or Alts 1 to 12 through a higher layer signaling (e.g. RRC signaling).

Figure 13:
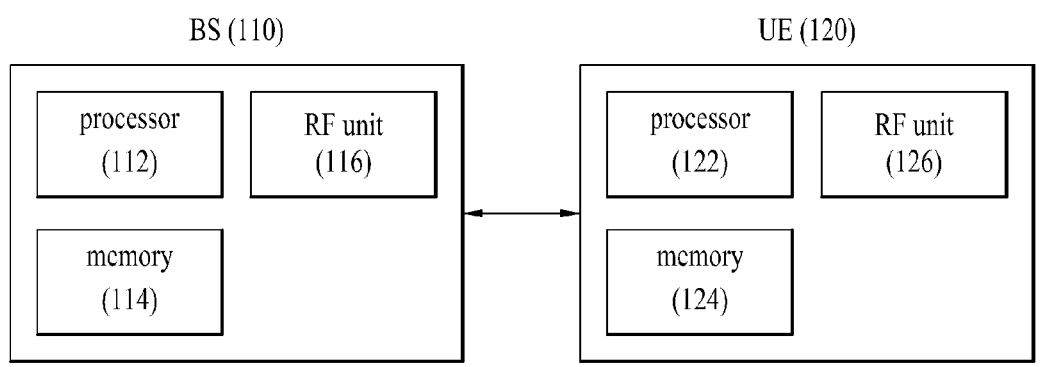
FIG. 13 illustrates a BS and a UIE applicable to the present invention.

FIG. 13 illustrates a BS, a relay and a UE applicable to the present invention.

Referring to FIG. 13, a wireless communication system includes a BS 110 and a UE 120. When the wireless communication system includes a relay, the BS or UE can be replaced by the relay.

The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other devices of a wireless mobile communication system. Specifically, the present invention is applicable to a method for transmitting uplink control information and an apparatus for the same.

The invention claimed is:

1. A method of performing communications by a user equipment (UE) in a time division duplexing (TDD)-based wireless communication system, the method comprising:

configuring a primary component carrier (PCC) and a secondary component carrier (SCC), wherein the PCC and the SCC are configured to have different uplink-downlink (UL-DL) configurations;

performing at least one of uplink transmission or downlink reception in each subframe of the PCC according to a first UL-DL configuration; and performing at least one of uplink transmission or downlink reception in each subframe of the SCC according to a second UL-DL configuration, wherein if a subframe #k is a downlink subframe in the PCC and a special subframe in the SCC, uplink transmission is limited in the subframe #k of the SCC, wherein if the subframe #k is a special subframe in the PCC and a downlink subframe in the SCC, a procedure for receiving a physical downlink shared channel (PDSCH) is limited in the subframe #k of the SCC, wherein each of the special subframe in the PCC and the special subframe in the SCC includes a downlink pilot time slot (DwPTS), a guard period (GP) and a uplink pilot time slot (UpPTS).

2. The method according to claim 1, wherein subframe patterns of the PCC and the SCC are given according to UL-DL configurations as follows:

| UL-DL | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a downlink subframe, U denotes an uplink subframe and S denotes a special subframe.

3. The method according to claim 1, wherein if the subframe #k is a downlink subframe in the PCC and a special subframe in the SCC, transmissions of a physical uplink control channel (PUCCH) signal, a physical random access channel (PRACH) signal and a sounding reference signal (SRS) in subframe #k of the SCC are dropped.

4. The method according to claim 1, wherein if the subframe #k is a downlink subframe in the PCC and a special subframe in the SCC, the UE operates on the assumption that a physical uplink shared channel (PUSCH) is not allocated to subframe #k of the SCC irrespective of whether or not the PUSCH has been actually allocated to subframe #k of the SCC.

5. The method according to claim 1, wherein if the subframe #k is a special subframe in the PCC and a downlink subframe in the SCC, the UE does not receive any downlink signal in one or more last orthogonal frequency division multiplexing (OFDM) symbols of the subframe #k of the SCC, wherein the one or more last OFDM symbols correspond to the GP and the UpPTS of the special subframe of the PCC.

6. A user equipment (UE) for use in a time division duplexing (TDD)-based wireless communication system, the UE comprising:
  a radio frequency (RF) unit; and
  a processor,
  wherein the processor is configured to:
    configure a primary component carrier (PCC) and a secondary component carrier (SCC), wherein the PCC and the SCC are configured to have different uplink-downlink (UL-DL) configurations
    perform at least one of uplink transmission or downlink reception in each subframe on the PCC according to a first UL-DL configuration and
    perform at least one of uplink transmission or downlink reception in each subframe on the SCC according to a second UL-DL configuration, wherein if a subframe #k is a downlink subframe in the PCC and a special subframe in the SCC, uplink transmission is limited in the subframe #k of the SCC, wherein if the subframe #k is a special subframe in the PCC and a downlink subframe in the SCC, a procedure for receiving a physical downlink shared channel (PDSCH) is limited in the subframe #k of the SCC, wherein each of the special subframe in the PCC and the special subframe in the SCC includes a downlink pilot time slot (DwPTS), a guard period (GP) and a uplink pilot time slot (UpPTS).

7. The UE according to claim 6, wherein subframe patterns of the PCC and the SCC are given according to UL-DL configurations as follows:

| UL-DL | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a downlink subframe, U denotes an uplink subframe and S denotes a special subframe.

8. The UE according to claim 6, wherein if the subframe #k is a downlink subframe in the PCC and a special subframe in the SCC, transmissions of a physical uplink control channel (PUCCH) signal, a physical random access channel (PRACH) signal and a sounding reference signal (SRS) in subframe #k of the SCC are dropped.

9. The UE according to claim 6, wherein if the subframe #k is a downlink subframe in the PCC and a special subframe in the SCC, the UE operates on the assumption that a physical uplink shared channel (PUSCH) is not allocated to subframe #k of the SCC irrespective of whether or not the PUSCH has been actually allocated to subframe #k of the SCC.

10. The UE according to claim 6, wherein if the subframe #k is a special subframe in the PCC and a downlink subframe in the SCC, the UE does not receive any downlink signal in one or more last orthogonal frequency division multiplexing (OFDM) symbols of the subframe #k of the SCC, wherein the one or more last OFDM symbols correspond to the GP and the UpPTS of the special subframe of the PCC.

* * * * *